April 8, 1958 D. PARRETT 2,829,750
FRICTION ELEMENTS FOR CLUTCHES, BRAKES AND THE LIKE
Original Filed April 22, 1955 3 Sheets-Sheet 1

INVENTOR.
Dent Parrett
BY
Robert Cobb
ATTORNEYS

April 8, 1958 D. PARRETT 2,829,750
FRICTION ELEMENTS FOR CLUTCHES, BRAKES AND THE LIKE
Original Filed April 22, 1955 3 Sheets-Sheet 3

INVENTOR.
Dent Parrett
BY
Robert Cobb
ATTORNEYS

# United States Patent Office 2,829,750
Patented Apr. 8, 1958

2,829,750

FRICTION ELEMENTS FOR CLUTCHES, BRAKES AND THE LIKE

Dent Parrett, St. Joseph, Mich., assignor, by mesne assignments, to Lambert Brake Corporation, St. Joseph, Mich., a corporation of Michigan Original application April 22, 1955, Serial No. 503,156. Divided and this application April 23, 1956, Serial No. 579,941

1 Claim. (Cl. 192—107)

This application is a division of application Serial No. 503,156, filed April 22, 1955.

The present invention relates to friction elements for use in clutches, brakes and the like, and more particularly to an improved friction facing or lining for such friction devices that is so constructed that the labor and time required to maintain and repair clutches and brakes are minimized.

An object of the invention is to provide a friction disc having independently replaceable friction lining segments, whereby the maintenance of clutches and brakes is simplified, particularly when such clutches and brakes are of a type having a double-disc assembly, since the lining segments can be replaced without necessitating disassembly of the double-disc assembly itself.

Another object is to provide a friction disc having a plurality of friction lining or facing elements disposed circumferentially therearound in contiguous relation, these friction elements each comprising a supporting plate having a friction lining or facing material secured thereon, and fastener means disposed between adjacent backing plates and projecting laterally into clamping engagement with two adjacent plates to rigidly connect the friction elements to the disc.

Other objects and advantages of the invention will be hereinafter described or will become apparent to those skilled in the art, and the novel feature thereof will be defined in the appended claim.

Figure 3:
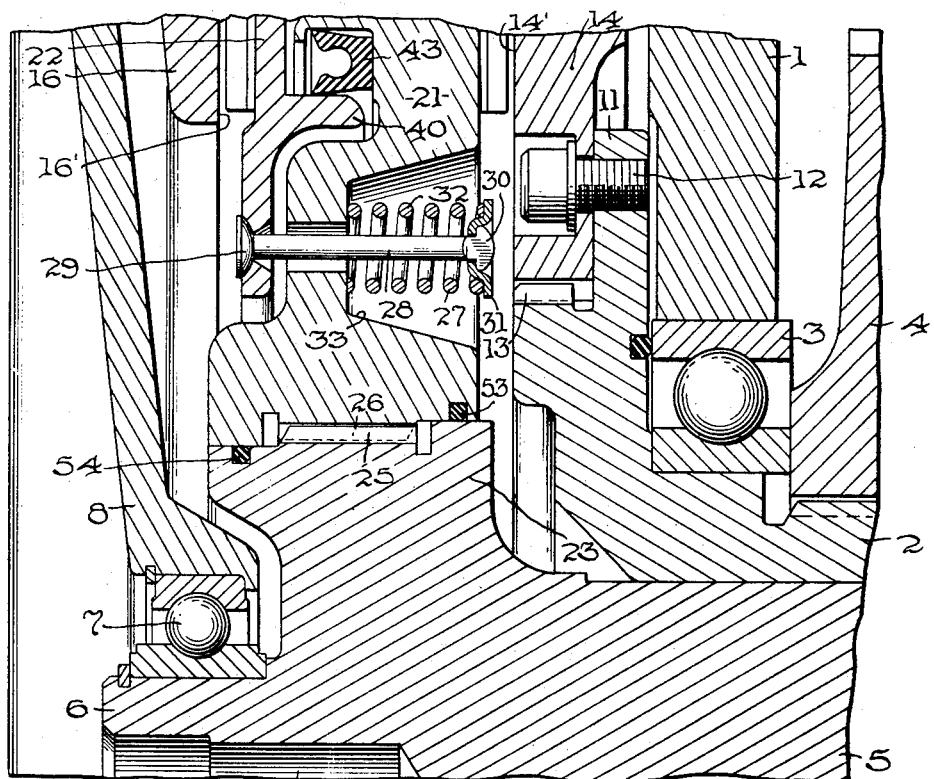
Figure 4:
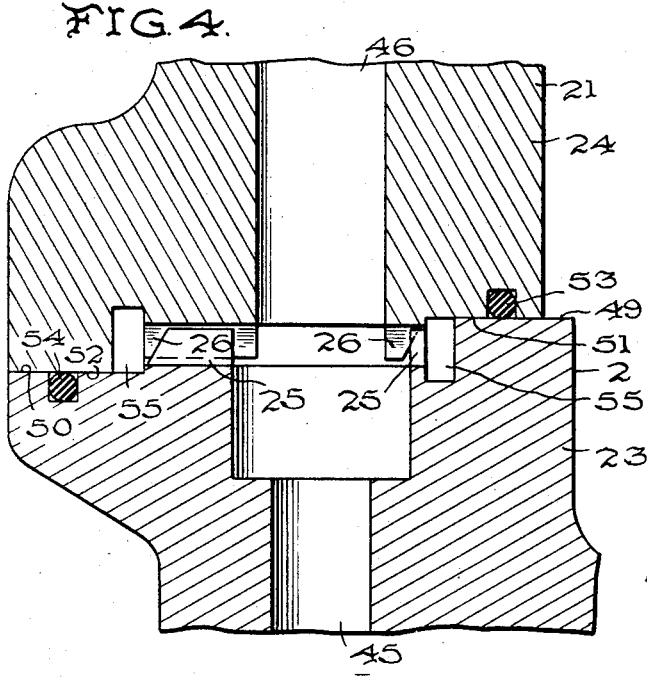

Fig. 3 is an enlarged fragmentary view in section, showing the connection of the inner double-disc assembly to a rotatable member and showing one of the springs for biasing the discs of the double-disc assembly together; and Fig. 4 is an enlarged fragmentary view in section, showing particularly the connection of the inner double-disc assembly to the rotatable member and the passages for the operating fluid through the connection.

Like reference characters in the several figures of the drawings and in the following description designate corresponding parts, wherein 1 generally denotes a side wall of a transmission case through which extends a hollow clutch input shaft or rotatable member 2, this member 2 being journalled in an opening in the case 1, as by means of a bearing assembly 3, and having splined thereon a driving bull gear 4 for imparting rotation to the clutch input member 2. Coaxially disposed in the hollow shaft 2 is an axially extended power output shaft or rotatable member 5 which projects laterally beyond the end of the input member 2. The output shaft 5 is preferably formed at its outer extremity with a central hub 6 on which is mounted the inner race of an anti-friction bearing 7, the outer race of the bearing 7 being disposed in a central opening in a radially extended, dome-like cover or casing 8, extended about the outer periphery of which is a radial flange 9 which is suitably secured to the transmission case 1, as by means of a suitable number of screws 10 or the like.

While the clutch assembly now to be described is for illustrative purposes shown as being applied to a hollow input shaft 2 and a coaxially extended countershaft 5 which is disposed within the hollow shaft 2, it is to be understood that the clutch is likewise applicable to other conventional arrangements of power input and output members, as will be apparent to those skilled in the art. Moreover, the details of the clutch assembly herein disclosed are not material to the present invention, but are merely illustrative of one advantageous application of the friction elements hereof. The clutch structure itself is the subject of the copending application above identified, of which this is a division.

Secured to a radial flange 11 formed on the outer end of the hollow shaft 2, as by means of a suitable number of screws 12, and locked against relative rotation as by means of a splined connection at 13, is the inboard section 14 of an annular clutch housing 15 which is cupped in shape. The outboard section 16 of the clutch housing 15 is preferably removably fitted to the outer peripheral wall 17 of the housing section 14 as by means of a splined connection at 18, and the outboard section 16 of the housing is rigidly secured in place as by means of a retaining snap ring 19. Thus, the housing 15 constitutes a rotatable annular housing having therein opposed, axially spaced and radially extended friction surfaces 14' and 16' on its respective inboard and outboard sections 14 and 16.

Disposed between the inner friction surfaces 14' and 16' of the housing 15, there is an inner double-disc assembly generally designated 20, including an inboard disc 21 and an outboard disc 22. Adjacent to its outer end, the output shaft 5 is preferably formed with an enlarged radially projecting supporting hub 23, and the inner periphery of the inboard disc 21 of the double-disc assembly 20 is formed with an axially extended hub 24 which surrounds the hub 23 of shaft 5, and which is adapted to be connected to the hub 23, so as to support the inboard disc 21 on the output shaft 5 for rotation therewith and for axial shifting movements thereon. For this purpose, the outer periphery of hub 23 and the inner periphery of hub 24 are respectively provided with mating splines 25 and 26. The outboard disc 22 of the double-disc assembly 20 is preferably supported on the inboard disc 21 by means of a plurality of circumferentially spaced spring assemblies 27, one of which is best illustrated in Fig. 3. Each spring assembly 27 includes a spring retaining pin 28 which projects through aligned openings in the respective discs 21 and 22 and is provided at one end with a generally hemi-spherical head 29 which rockably seats in a corresponding depression in the outboard face of the outboard disc 22. The other end of the spring retaining pin 28 is provided with a slightly enlarged spring seat-retaining head 30 for removably retaining an annular spring seat 31 at this end of the pin, with a coiled compression spring 32 interposed between the spring seat 31 and the opposed surface of the inboard face of the inboard disc 21 and surrounding the pin 28. In order to accommodate the respective springs 32, the inboard disc 21 is preferably provided with generally conical recesses or depressions 33 in which the spring assemblies 27 are disposed.

Under the influence of the spring assemblies 27, the outboard disc 22 is centralized on the inboard disc 21 by a plurality of camming balls 34 which are interposed between the discs 21 and 22, each ball seating in a pair of oppositely disposed conical seats 35, 36 respectively formed in a pair of opposed inserts 37 and 38 mounted in opposing portions of the respective discs 21 and 22. Upon slight relative rotation between the discs 21 and 22, the balls 34 also serve to effect a powerful self-energization of the clutch.

Figure 2:
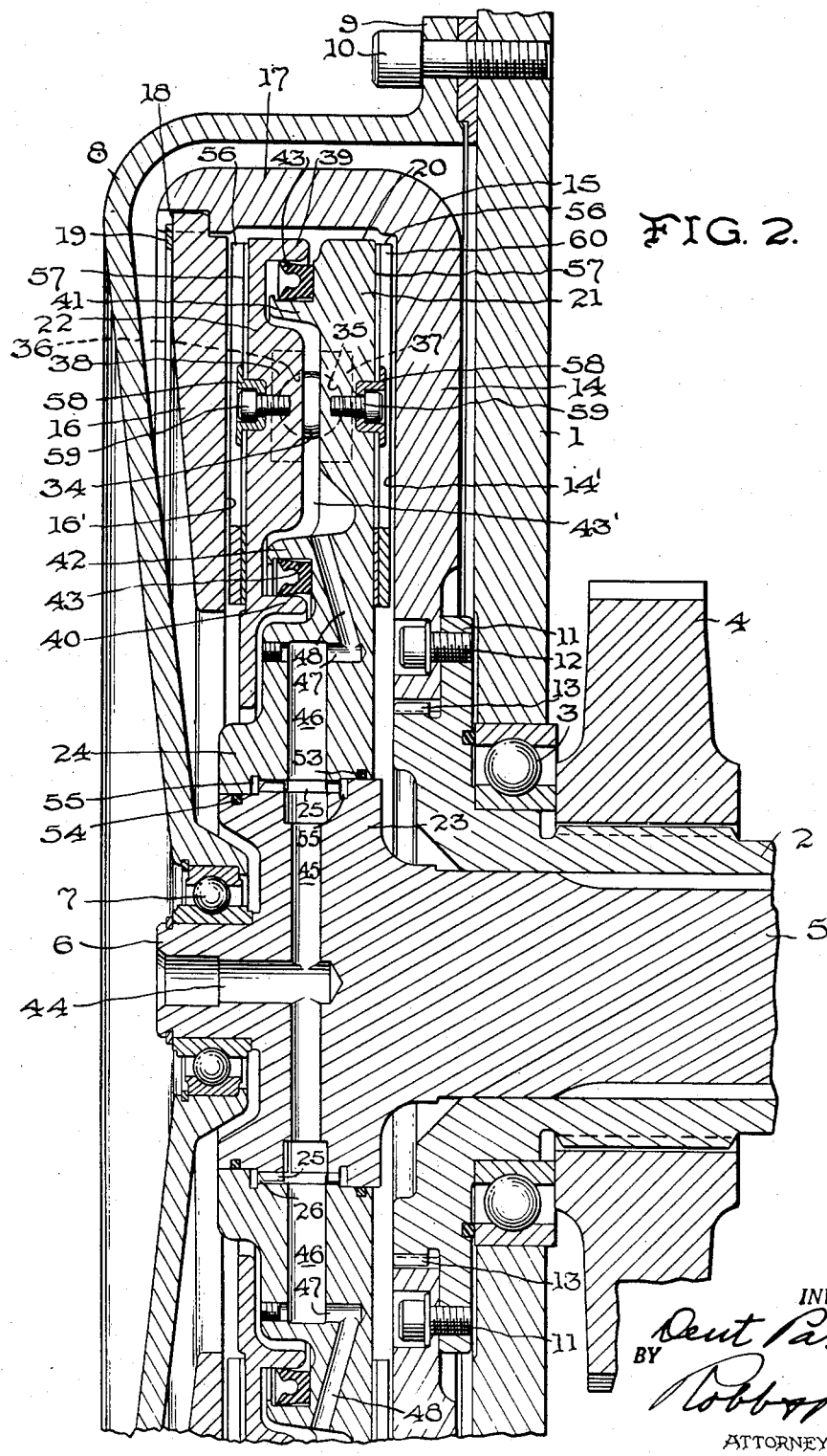
Fig. 2 is an enlarged fragmentary view in section, as taken on the line 2—2 of Fig. 1.

As is best illustrated in Fig. 2, the outboard disc 22 has an axially extended flange 39 formed about its outer periphery, and spaced radially inward from the flange 39 is a corresponding annular, axially extended flange 40, the flanges 39 and 40 projecting towards the inboard disc 21. The inboard disc 21 is also provided with an annular, axially extended flange 41 formed adjacent to its outer periphery and projecting towards the outboard disc 22 in radially inwardly spaced relation to the flange 39 of the latter disc, and the inboard disc 21 is also formed with a second annular, axially extended flange 42 which is disposed in radially outwardly spaced relation to the flange 40 on the outboard disc 22. Interposed between the flanges 39 and 41 and between the flanges 40 and 42 on the outboard and inboard discs 22 and 21, respectively, is a pair of annular seals 43, 43. These seals 43 are preferably made of resilient material and are of a well-known type which are caused to expand slightly to enhance their sealing action, responsive to fluid pressure. Accordingly, it will be seen that intermediate the seals 43, 43, an annular pressure chamber 43' is defined between the discs 21 and 22 of the inner double-disc assembly, said chamber constituting an annular actuator cylinder by means of which the discs may be shifted axially apart by supplying fluid under pressure to the annular actuator cylinder.

In order to supply operating fluid to the annular actuator cylinder defined between the discs, the power output shaft 5, at its central axis, is provided with an axially extended fluid conduit or passage 44 which communicates with a diametrically extended passage 45. The passage 45 communicates with a pair of diametrically opposed, radially extended passages 46, 46 formed in the hub 24 of the inboard disc 21. At diametrically opposite points adjacent to the outer extremity of each passage 46 in the inboard disc 21, this disc is preferably bored to form parallel, axially extended passages 47, 47 which connect the passages 46 with a pair of inclined passages 48, 48 in the inboard disc 21, the latter passages communicating with the annular actuator cylinder 43' between the discs 21 and 22. It will be noted that the fluid passages formed in the hub 23 of the power output shaft 5 and the hub 24 of the inboard disc 21 are in communication with one another through the splines 25 and 26 which are respectively formed on the outer and inner peripheries of these hubs.

To prevent leakage of actuating fluid through the connection between the inboard disc 21 and the output member 5, the hub 23 of the output member 5 is preferably formed with a pair of axially extended and axially spaced annular surfaces 49 and 50 located adjacent to the opposite ends of the splines 25 thereon, as best illustrated in Fig. 4. Closely fitting the annular surfaces 49 and 50 is a pair of mating annular surfaces 51 and 52 formed on the inner periphery of the inboard disc 21 adjacent to the opposite ends of the splines 26 thereon. Suitable seals are provided for preventing the passage of operating fluid between the annular surfaces 49 and 51 and the annular surfaces 50 and 52, respectively, and preferably, such seals are in the form of resilient O-rings designated 53 and 54, respectively. At the opposite ends of the splines 25 and 26 on the hubs 23 and 24 of the output member 5 and the inboard disc 21, the hubs are preferably formed with complemental annular depressions which, when the hubs are in assembled relation, define a pair of annular fluid chambers 55, 55 at opposite ends of the splined connection. When a liquid operating fluid is being utilized, it will be understood that the liquid will fill the annular chambers 55, 55 and lubricates all of the splines 25 and 26, so as to assure easy movement of the inboard disc 21 on the output member 5 in an axial direction during actuation and release of the clutch. However, such lubrication is not essential, and air is an equally effective and serviceable operating fluid medium.

Figure 1:
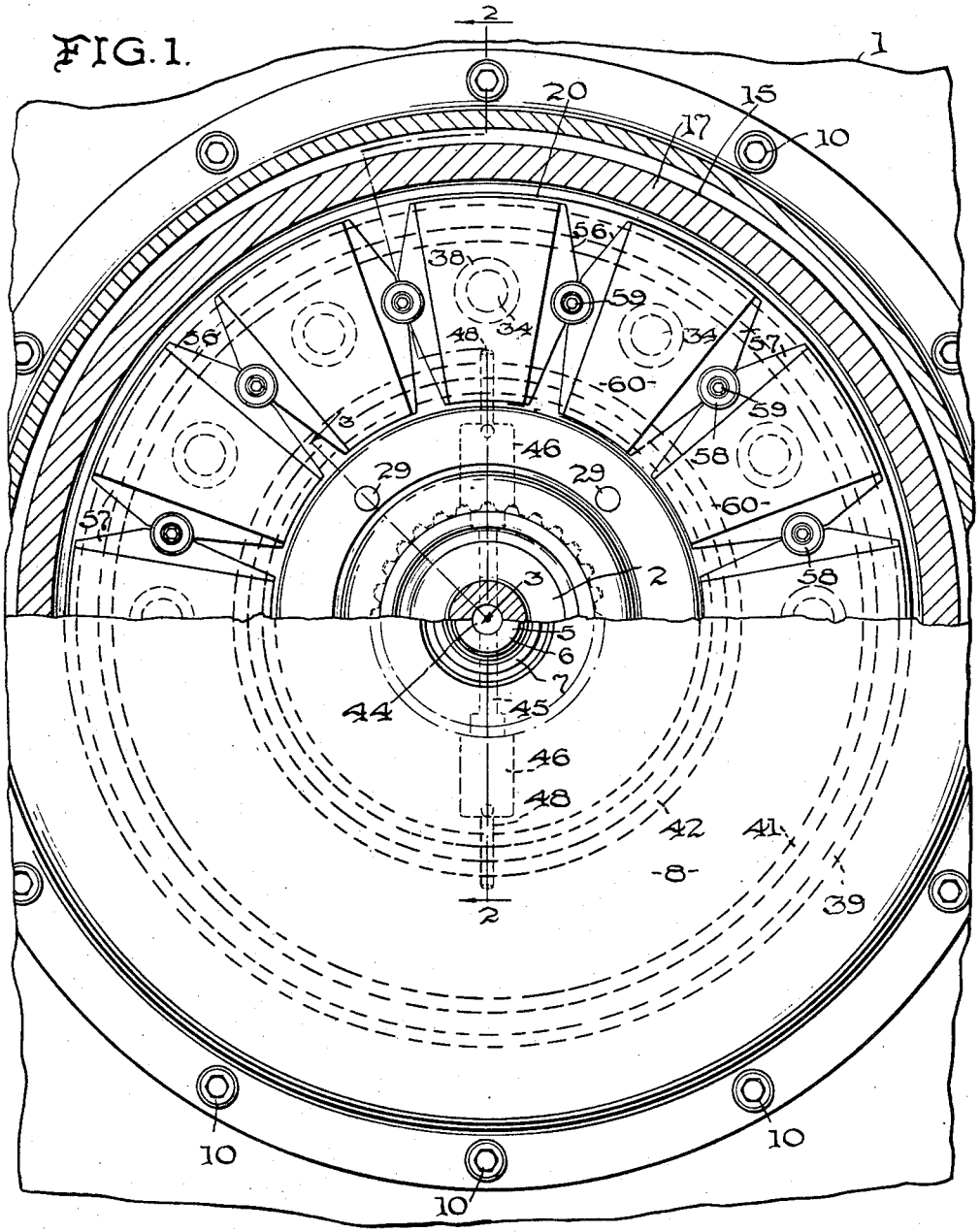
Fig. 1 is a view, partly in elevation, of a clutch embodying the invention, with the upper half of the outer cover and the disc housing broken away to expose the upper portion of the inner double-disc assembly in elevation.

In order to facilitate maintenance and service of the clutch, the discs 21 and 22 of the inner double-disc assembly 20 are each preferably provided on their surfaces that are opposed to the friction surfaces 14' and 16' in the housing 15 with a plurality of circumferentially spaced, identical friction lining units generally designated 56. Each friction lining unit 56 preferably comprises a friction lining supporting base plate 57 which is polysided in outline and tapers in width toward both its inner and outer marginal edges and the base plates 57 are disposed in side-by-side relationship about the discs 21 and 22 and are secured on the respective inboard and outboard faces of the discs by means of a plurality of anchor elements. These anchor elements each include a cupped washer 58 having its central portion seated in a corresponding depression in the respective discs 21 and 22, and the head of a screw or other fastener 59 is seated in the central depressed portion of each of the washers 58 when the lining units are attached to the discs. As is best illustrated in Fig. 1, each friction lining base plate 57 projects at its widest point into contiguous relation to each adjacent plate 57, and the washers are each provided with a marginal flange overlying the adjacent edges of a pair of adjacent plates 57, so that each washer 58 serves to secure the adjacent sides of a pair of such plates 57. In addition, the plates are preferably notched or recessed at their widest points for receiving the cupped portion of the anchor washers. Suitably secured on the outer face of each of the base plates 57 is a friction lining sector or segment 60, these lining segments 60 preferably being bonded to the supporting plates 57. Accordingly, the friction lining surfaces of the clutch are constituted by a plurality of independently replaceable friction lining units which are readily removable from the inner double-disc assembly 20, without necessitating disassembly of the disc assembly itself.

In operation, operating fluid under pressure will be supplied through the passage 44 at the axis of the power output member 5, and will flow in diametrically opposed directions through passage 45 into passages 46, 47 and 48 into the annular actuator cylinder 43' between the discs 21 and 22, so as to shift the discs 21 and 22 axially apart and into engagement with the opposed faces 14' and 16' of the rotary housing 15. Thus, torque will be transmitted through the housing 15 and the inner double-disc assembly 20 from the power input or rotatable member 2 to the power output or rotatable member 5. When either the starting or the operating load on the output member 5 tends to cause slippage of the double-disc assembly 20 relative to the housing 15, the outboard disc 22 will rotate slightly relative to the inboard disc 21, thereby causing the balls 34 to climb the opposed ramps 35 and 36 to effect a powerful self-energization of the clutch which positively precludes slippage thereof.

In view of the foregoing, it should be recognized that there has been provided a relatively simple friction clutch in which the actuator means for the clutch, in effect, constitutes the friction discs therefor, thus effecting a substantial saving of space, but without any attending sacrifice in the torque capacity of the clutch. In addition, the clutch will require substantially less applied force to actuate the same than has been required in previous clutches, due in part to the relatively large surface of the annular actuator cylinder between the discs which is subject to the applied force of the operating fluid.

While the specific details of the invention have been herein shown and described, changes and alterations may be resorted to without departing from the spirit thereof as defined in the appended claim.

I claim:

A friction disc of the class described, including a disc body, a plurality of backing plates seated on one face of said disc body and disposed in circumferentially contiguous relation to each other about said body and having their opposite edges centrally notched, a segment of lining material secured to each of said plates, screw fastener means disposed between the notched contiguous edges of each adjacent pair of plates for securing said plates on said disc body, said fastener means including a headed screw and a cupped washer having a marginal clamping flange overlying the adjacent pairs of plates aforesaid, the cupped portion of each washer being apertured and seated in the opposed notches of each pair of said plates, said disc body having recesses in which the cupped portion of the respective washers are seated, and each screw extending through a cupped washer and having the head portion seated and recessed in the cupped portion of the washer when the backing plates and lining segments are assembled on the friction disc.

References Cited in the file of this patent

UNITED STATES PATENTS

| | | |
|---|---|---|
| 697,271 | Norris | Apr. 8, 1902 |
| 1,544,678 | Norris | July 7, 1925 |
| 2,228,622 | Emrich | Jan. 14, 1941 |
| 2,541,979 | Amundsen | Jan. 14, 1951 |
| 2,767,817 | Davis | Oct. 23, 1956 |

FOREIGN PATENTS

| | | |
|---|---|---|
| 171,503 | Great Britain | Nov. 24, 1921 |